C. D. LOTHROP.
Saws.
No. 147,335.                                              Patented Feb. 10, 1874.
Fig. 1.
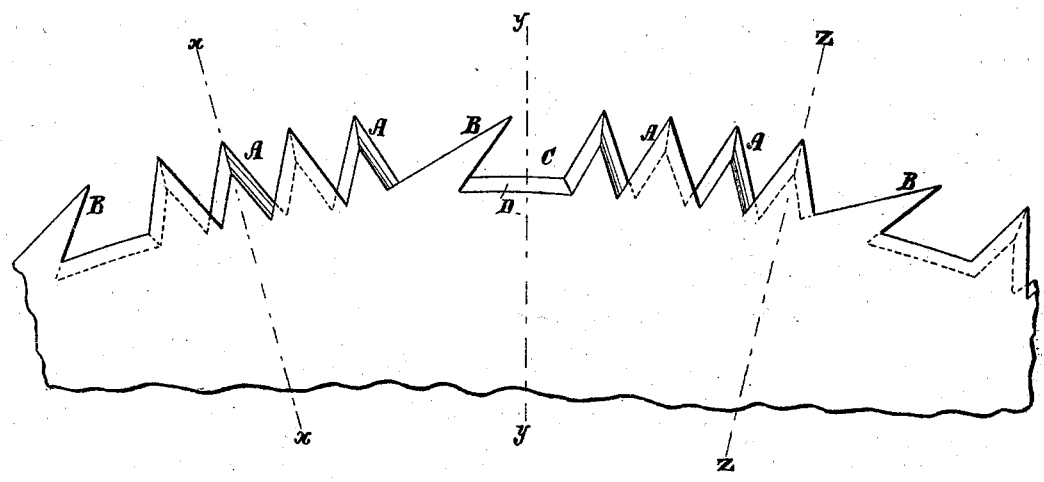
Fig. 2.   Fig. 3.   Fig. 4.
  
WITNESSES:                                                   INVENTOR:

UNITED STATES PATENT OFFICE.

CHARLES D. LOTHROP, OF NEW YORK, N. Y.

IMPROVEMENT IN SAWS.

Specification forming part of Letters Patent No. 147,335, dated February 10, 1874; application filed January 10, 1874.

*To all whom it may concern:*

Be it known that I, CHARLES D. LOTHROP, of the city, county, and State of New York, have invented a new and Improved Saw, of which the following is a specification:

The invention will first be fully described, and then pointed out in the claim.

Figure 1 is a side elevation of a part of a circular-saw blade with teeth arranged according to my invention. Fig. 2 is a section on the line $x\,x$. Fig. 3 is a section on the line $y\,y$, and Fig. 4 is a section on the line $z\,z$.

Similar letters of reference indicate corresponding parts.

A represents the teeth for cutting off the fibers. They are like any ordinary cross-cutting teeth, except they are beveled a good deal more to make sharp knife-edge points for cutting off the fibers nicely, and they are set by bending them outward a little near the points. They are arranged in groups of four, or thereabout, and between each group is a planing clearing-tooth, B, filed square to the saw-plate, and arranged on a pitch, by which it is adapted to plane out the stuff cut off but left in the kerf by the teeth A. In front of each planing-tooth A is a wide notch, C, for clearance, with the bottom D beveled acutely to the saw-plate, so that the dust kept in the notch, while passing through the log, by the walls of the kerf, will shoot off at the side as soon as it emerges from the log, whereas it clogs in so hard sometimes, when the bottom is square to the saw-plate, as to be carried until cleared out by hand.

By thus arranging the teeth, the saw is rendered equally as useful for cutting one way of the grain as the other, so that it saves the necessity of shifting saws for cutting different ways, as is necessary with all other saws.

Having thus described my invention, I claim as new and desire to secure by Letters Patent—

The bottom of the clearing-notches D, beveled acutely to the saw-plate, as described.

CHAS. D. LOTHROP.

Witnesses:
A. P. THAYER,
T. B. MOSHER.